5/12/87    XR    4,665,517

United States Patent [19]
Widmer

[11] Patent Number: 4,665,517
[45] Date of Patent: May 12, 1987

[54] METHOD OF CODING TO MINIMIZE DELAY AT A COMMUNICATION NODE

[75] Inventor: Albert X. Widmer, Katonah, N.Y.

[73] Assignee: International Business Machines Corporation, Armonk, N.Y.

[21] Appl. No.: 567,198

[22] Filed: Dec. 30, 1983

[51] Int. Cl.[4] .................................................. H04J 3/12
[52] U.S. Cl. ..................... 370/86; 370/110.1
[58] Field of Search ................ 370/60, 90, 82, 86, 370/110.1; 340/825.5

[56] References Cited

U.S. PATENT DOCUMENTS

| | | | |
|---|---|---|---|
| 3,985,962 | 10/1976 | Jones et al. | 370/90 |
| 4,271,509 | 6/1981 | Brolin | 370/110.1 |
| 4,346,440 | 8/1982 | Kyu et al. | 370/86 |
| 4,410,889 | 10/1983 | Bryant et al. | 370/82 |
| 4,422,071 | 12/1983 | de Graaf | 340/825.5 |
| 4,482,999 | 11/1984 | Jansen et al. | 370/60 |
| 4,486,739 | 12/1984 | Franaszek et al. | 340/347 DD |

FOREIGN PATENT DOCUMENTS 55-138943 10/1980 Japan .
58-123249 7/1983 Japan .
2120055 11/1983 United Kingdom .

Primary Examiner—Douglas W. Olms
Assistant Examiner—Curtis Kuntz
Attorney, Agent, or Firm—Sughrue, Mion, Zinn, Macpeak & Seas

[57] ABSTRACT

A method of coding control blocks for packet communication wherein the code for control information is restricted to a smaller subset of the coding set used for data blocks. The smaller subset has the property that subfields within the field of the block can be recognized and decoded without the remainder of the encoded block having been received. An 8B/10B code, consisting of 3B/4B and 5B/6B subfields, has the required property. In packet communication, the recognition in an early control subfield that the packet is to be retransmitted allows bit-by-bit retransmission of the encoded packet with only the early subfield being processed.

7 Claims, 4 Drawing Figures

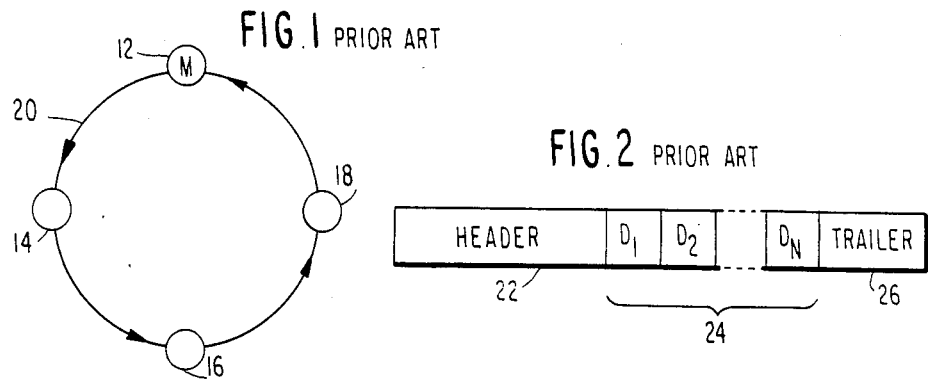
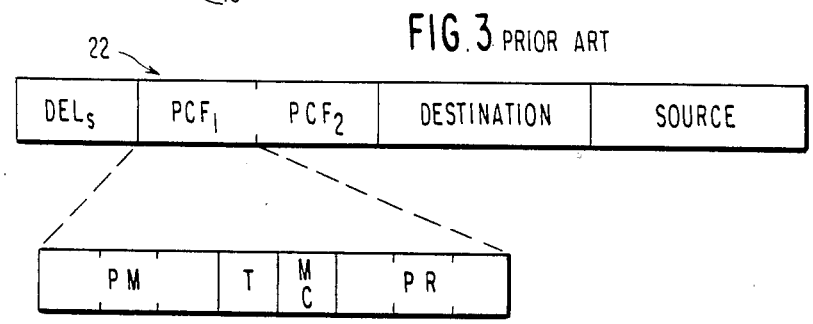
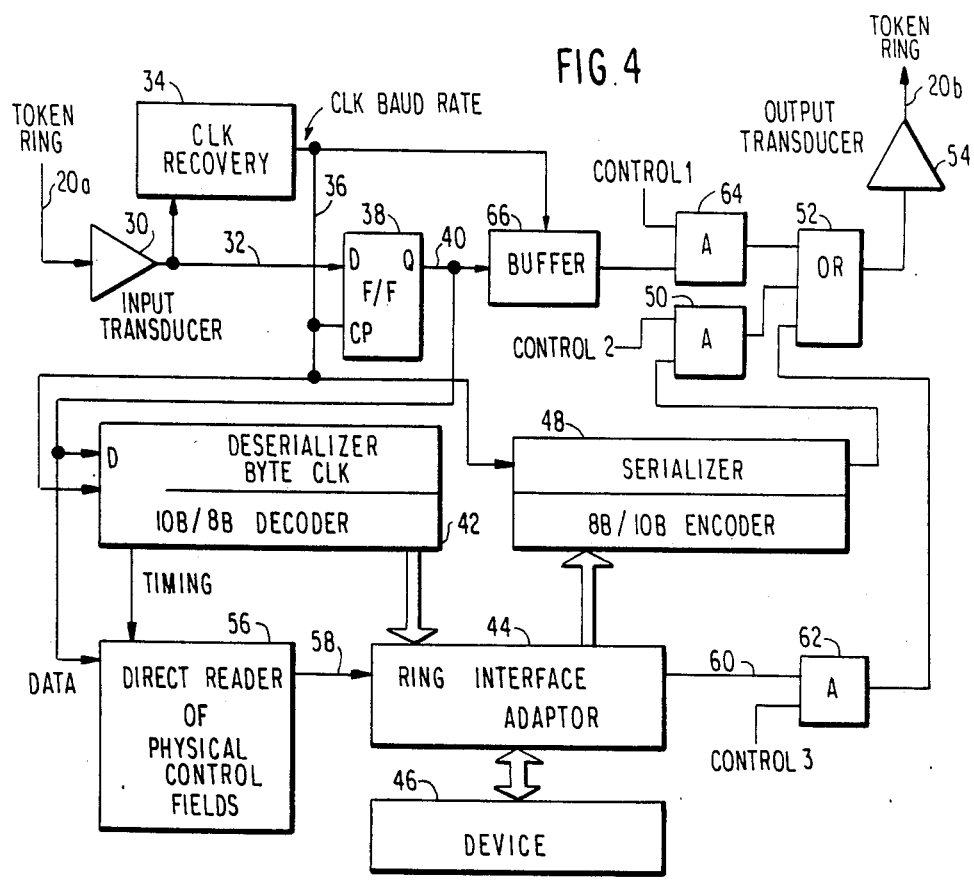

METHOD OF CODING TO MINIMIZE DELAY AT A COMMUNICATION NODE

BACKGROUND

1. Field of the Invention

The invention relates generally to communication coding, and it relates, in particular, to coding of control blocks in order to minimize delay between reception and transmission at a node.

2. Prior Art

One popular type of local network communication system is a token ring, the structure of which is illustrated in FIG. 1. Further details on token rings are available in an article by N. C. Strole, entitled "A Local Communication Network Based on Interconnected Token-Access Rings: A Tutorial", appearing in the *IBM Journal of Research and Development*, volume 27, 1983 at pages 481–496. The token ring consists of multiple nodes 12, 14, 16 and 18 in the example, although rings of up to several hundred nodes are typically used. In the general case, each node is capable of receiving and sending messages to and from every other node on the ring. The nodes are connected by a uni-directional transmission line 20 that, as the name implies, forms a ring that closes on itself. The nodes are relatively independent of each other and, with the exception of a monitor node 12, are functionally equivalent. The monitor node 12 does not directly control the other nodes 14, 16 and 18, but performs the necessarily centralized tasks of timing synchronization and monitoring of the health of the ring. Data is transmitted between nodes in the form of packets having the format illustrated in FIG. 2. The packet consists of a header 22 which indicates to a receiving node that a packet is arriving, provides the information as to which node the packet is intended, synchronizes the clocks of the receiving node and provides some information as to the format of the packet. Following the header is the data stream 24 consisting of a series of blocks of data $D_1, D_2, \ldots D_N$. The length N of the data stream 24 can be any value up to a predetermined maximum and is not defined in the header 22. Thus the packet can contain a short message, a long message, or possibly no message at all. Following the data stream 24 is a trailer 26 that defines the end of the packet and provides space for certain houskeeping information to be transmitted along with the message. Because the data in the data stream 24 can be any possible value but the trailer 26 must be distinguished from a block of data $D_N$, it is necessary that the blocks $D_1, D_2, \ldots D_N$ be encoded. For the purposes of this application, coding for 2 block implies that additional bits have been added to the block for transmission over and above the number of bits of information in the block. The extra bits can denote a class of information with the information bits defining the information once the class has been defined. A very simple example of coding for blocks of data consisting of eight-bit bytes of data would be to add a ninth bit which would indicate if that encoded block is a data byte or a control byte. Once a block has been detected with the ninth bit indicating a control block, a receiving node would know that the data stream 24 is completed and what is being received is the trailer 26. It should be noted that only the first block of the trailer needs to be internally denoted as a control block. The remaining blocks may be data blocks included within the trailer format. Similar coding is required to signal the start of a packet. Coding is used for many other purposes than differentiating data and control blocks. One important purpose is to transform data into a signal stream suitable for serial transmission in which there must be frequent transitions for clock recovery at the receiving end. It is also desirable that the transmitted code be DC balanced, that is, that over some length of transmission the number of zeroes equals the number of ones. As example of such a code is Manchester code in which for data a binary zero is represented by 01 and a binary one is represented by 10. Thus Manchester coded data is necessarily DC balanced and has a transition in every complementary bit pair. If Manchester code is received consisting of three consecutive zeroes or three consecutive ones, i.e. 000 or 111, the receiving node knows that the received code is not data but should instead be interpreted as control blocks. The DC balance of control blocks is accomplished by further constraints on the entire control block. Thus it is seen that coding can take a much more complex form than simply adding a bit to indicate an additional characteristic of the block. Manchester coding is simple but inefficient.

Since the data stream 24 is subdivided into data blocks $D_1, D_2, \ldots D_N$, the header 22 in the trailer 26 is also typically broken down into individual blocks of the same size. For token ring communication systems, the header 22 contains a token. If a node receives a packet with a free token, i.e. the token in the header 22 indicates that the packet is not being used for a message from some other node, the receiving node can take the token by changing its value in the header 22, retransmitting the header with the changed token value followed by the message which that node desires to transmit, and of course finishing the transmission with the trailer 26. If, however, the receiving node detects a busy token, i.e. the value of the token in the header 22 indicates that a message or data stream 24 follows in the packet, then the receiving node simply retransmits the packet onto the next code. For example, if the node 14 in FIG. 1 receives a packet with a free token and it wishes to transmit a message, it takes the token by changing its value in the header. The transmitting node also adds a destination and a source address to the header to indicate which of the nodes on the ring should receive the message and the sender of the message. The message is then transmitted as the data stream 24, followed by an appropriate trailer 26.

If the node 14 is sending the message to the node 18 which is two nodes away, then the packet first arives at the intermediate node 16. This node first receives the header 22 and determines that the token is busy so that it cannot transmit its message in this packet and simply remains in a retransmission mode. Furthermore, from the destination address, it discovers that the message is intended for another node and ignores the packet for its own use. Of course, the node 16 also retransmits the trailer 26 perhaps with some slight modifications for housekeeping chores. When the packet is received by the destination node 18, once again the busy token indicates that it cannot transmit its own message on this packet. However it determines from the destination address that it is the intended recipient of the message and accordingly copies the data stream 24. In a typical system, the receiving node 18 retransmits the data stream 24 intact so that the packet eventually arrives back at the originating node 14 which can thereby determine that the message has travelled around the ring. At that time, the originating node changes the token back to a free token and removes the addresses, the data $D_1, D_2 \ldots D_N$ in the data stream 24, and the trailer 26 from the packet. Repeating the process, some other node receiving this packet with a free token and wishing to transmit a message grabs the token.

It is to be understood that a packet can pass through a very large number of nodes between the originating and destination nodes. At each of these intermediate nodes, a node must read and decode the header 22 to determine its subsequent course of action. The delay involved in the processing of the header introduces two difficulties. First of all, any delay within the node is equivalent to lengthening the transmission line 20 with the result that this delay, multiplied by the number of nodes on the ring, slows down the throughput of the ring. It must be remembered that in a typical ring, there is only a single token for a single message so that the circulation time around the ring, including all the nodal delays, limits the ring throughput. Furthermore, during the time that any node is receiving, decoding and processing the header 22, the blocks of the packet continue to arrive. Therefore, buffer memories must be provided to store the received data until it is retransmitted. Thus complex processing of the header 22 entails not only complex processing circuitry, but also large amounts of buffer storage. An ideal situation would be if, immediately upon the reception of the beginning of the header 22, the decision could be reached that the token is busy so that the data stream 24 could be retransmitted immediately upon reception. A token constitutes only one bit of information, busy or free. However in general coding schemes, there is not one bit in the encoded word which would correspond to the one bit token. In conventional systems, the entire block containing the token needs to be received and then decoded before the value of the token can be determined. Even with these minimal restraints, a significant mimimum delay is introduced at each node and a corresponding amount of buffer memory needs to be provided.

SUMMARY

Accordingly, it is an object of the invention to provide a method of encoding communication control blocks whereby the delay in determining the control is mimimized.

It is another object of this invention to provide a minimal delay method of encoding control blocks within the context of an efficient 8B/10 B transmission code.

It is a further object of this invention to provide a control block decoder and processor of simple circuitry and using little or no buffer storage.

It is yet a further object of this invention to provide a method of encoding for token ring communication systems that allows for fast and efficient operation at the nodes of the ring.

The invention can be summarized as a method for encoding communication control blocks wherein a sub-block of an encoded control block can be separately read (and decoded, if necessary) before the reading and decoding of the rest of the control block so that the receiving node can appropriately respond with minimum delay.

BRIEF DESCRIPTION OF THE DRAWINGS

FIG. 1 is a schematic illustration of a token ring communication system;

FIG. 2 is an illustration of the format of a packet in a communication system;

FIG. 3 is an illustration of the format of a header is a packet; and

FIG. 4 is a schematic representation of the circuitry at a node useful within this invention.

DETAILED DESCRIPTION OF THE PREFERRED EMBODIMENTS

One coding method that appears to be particularly useful for token rings is the 8B/10B transmission code. This code is described in detail in an article by the inventor and P. A. Franaszek entitled "A DC-Balanced, Partitioned-Block, 8B/10B Transmission Code", appearing in the *IBM Journal of Research and Development*, vol. 27, 1983, at pages 440–451. Subject matter of this article appears in a U.S. patent application, Ser. No. 394,045, filed June 30, 1982 by Franaszek et al, now issued as U.S. Pat. No. 4,486,739. By 8B/10B coding is meant that eight bits of data are encoded to ten bits of transmitted code. The extra two bits of code serve a variety of purposes, including differentiating control blocks from data blocks and providing DC balance and transitions for clock recovery. Although 8B/10B codes have previously been described because of the popularity of eight-bit bytes, Widmer and Franaszek additionally partition each eight-bit byte into two sub-blocks which are separately encoded. The result is that the 8B/10B coding is divided into a 3B/4B coding and a 5B/6B coding. If an eight-bit byte ABCDEFGH is to be encoded into a ten-bit block abcdeifghj, then the first five bits ABCDE are separately encoded into abcdei and the last three bits FGH are separately encoded into fghj. The coding tables given by Widmer and Franaszek are presented in Table 1 for the 5B/6B encoding and in Table 2 for the 3B/4B encoding. Restricting the discussion now to Table 1, the first column gives the name of the five-bit sub-block to be encoded. A D represents data and a K represents a recognizable control sub-block. A data word can be used for control information if other means exist for recognizing it as control. Because $2^5 = 32$, there are 32 possible sub-blocks, all represented in Table 1. However in the scheme of this table, only five of the five-bit sub-blocks can be used for control purposes without further format control. The five-bit column beneath ABCDE gives the binary representation of the five-bit sub-block to be encoded. The value of K describes whether the sub-block contains data or control information. If K=0, the sub-block is data, possibly within a control field; if K=1, the sub-block is for explicit control; and if the entry in the K column is x, then the sub-block can be used for either data or control.

TABLE I

5B/6B ENCODING

| NAME | ABCDE | K | D-1 | abcdei | D0 | abcdei ALTERNATE |
|---|---|---|---|---|---|---|
| D.0 | 00000 | 0 | + | 011000 | — | 100111 |
| D.1 | 10000 | 0 | + | 100010 | — | 011101 |
| D.2 | 01000 | 0 | + | 010010 | — | 101101 |
| D.3 | 11000 | 0 | x | 110001 | 0 | |
| D.4 | 00100 | 0 | + | 001010 | — | 110101 |
| D.5 | 10100 | 0 | x | 101001 | 0 | |
| D.6 | 01100 | 0 | x | 011001 | 0 | |
| D.7 | 11100 | 0 | — | 111000 | 0 | 000111 |
| D.8 | 00010 | 0 | + | 000110 | — | 111001 |
| D.9 | 10010 | 0 | x | 100101 | 0 | |
| D.10 | 01010 | 0 | x | 010101 | 0 | |
| D.11 | 11010 | 0 | x | 110100 | 0 | |

TABLE I-continued
5B/6B ENCODING

| NAME | ABCDE | K | D-1 | abcdei | DO | abcdei ALTERNATE |
|------|-------|---|-----|--------|----|-----------------| 
| D.12 | 00110 | 0 | x | 001101 | 0 | |
| D.13 | 10110 | 0 | x | 101100 | 0 | |
| D.14 | 01110 | 0 | x | 011100 | 0 | |
| D.15 | 11110 | 0 | + | 101000 | − | 010111 |
| D.16 | 00001 | 0 | − | 011011 | + | 100100 |
| D.17 | 10001 | 0 | x | 100011 | 0 | |
| D.18 | 01001 | 0 | x | 010011 | 0 | |
| D.19 | 11001 | 0 | x | 110010 | 0 | |
| D.20 | 00101 | 0 | x | 001011 | 0 | |
| D.21 | 10101 | 0 | x | 101010 | 0 | |
| D.22 | 01101 | 0 | x | 011010 | 0 | |
| D/K.23 | 11101 | x | − | 111010 | + | 000101 |
| D.24 | 00011 | 0 | + | 001100 | − | 110011 |
| D.25 | 10011 | 0 | x | 100110 | 0 | |
| D.26 | 01011 | 0 | x | 010110 | 0 | |
| D/K.27 | 11011 | x | − | 110110 | + | 001001 |
| D.28 | 00111 | 0 | x | 001110 | 0 | |
| K.28 | 00111 | 1 | − | 001111 | + | 110000 |
| D/K.29 | 10111 | x | − | 101110 | + | 010001 |
| D/K.30 | 01111 | x | − | 011110 | + | 100001 |
| D.31 | 11111 | 0 | − | 101011 | + | 010100 |

TABLE II
3B/4B ENCODING

| NAME | FGH | K | D-1 | fghj | DO | fghj ALTERNATE |
|------|-----|---|-----|------|----|--------------| 
| D/K.x.0 | 000 | x | + | 0100 | − | 1011 |
| D.x.1 | 100 | 0 | x | 1001 | 0 | |
| D.x.2 | 010 | 0 | x | 0101 | 0 | |
| D/K.x.3 | 110 | x | − | 1100 | 0 | 0011 |
| D/K.x.4 | 001 | x | + | 0010 | − | 1101 |
| D.x.5 | 101 | 0 | x | 1010 | 0 | |
| D.x.6 | 011 | 0 | x | 0110 | 0 | |
| D.x.P7 | 111 | 0 | − | 1110 | + | 0001 |
| D/K.y.A7 | 111 | x | − | 0111 | + | 1000 |
| K.28.1 | 100 | 1 | + | 1001 | 0 | 0110 |
| K.28.2 | 010 | 1 | + | 0101 | 0 | 1010 |
| K.28.5 | 101 | 1 | + | 1010 | 0 | 0101 |
| K.28.6 | 011 | 1 | + | 0110 | 0 | 1001 |

K.x RESTRICTED TO K.28
K.y RESTRICTED TO K.23, K.27, K.28, K.29, K.30

The last two columns beneath abcdei are the encoded sub-blocks. Where there are two possible encoded forms, the one chosen depends upon the disparity. The disparity of a block of data is the difference between the number of ones and zeroes in the block. Positive and negative disparity numbers refer to an excess of ones and zeroes respectively. A running disparity is the sum of the disparity of the preceding blocks. In DC-balanced codes, the disparity is kept as close to zero as possible and over a finite length the numbers of ones and zeroes are equal. The value of D−1 is the most recent non-zero running disparity at the end of a sub-block. For those encoded entries that have two alternatives, the alternative is chosen for which the value of D-1 corresponds to the running disparity. All of these alternate entries, with the exception of D.7, are ones which themselves have non-zero disparity so that the running disparity at the end of the encoded sub-block assumes the opposite value DO. Those encoded sub-blocks which themselves have zero disparity (except D.7) are marked with x in the disparity columns because they do not change the running disparity and are used for any value of the running disparity, which remains the same before and after the sub-block as indicated by a 0 in the DO column.

A similar table for 3B/4B encoding is presented in Table 2 and requires no further explanation for the purposes of this invention.

The format of the header 22 as described in the aforementioned article by Strole is given in FIG. 3. The header begins with a delimiter $DEL_S$ that identifies the start of a packet. The delimiter $DEL_S$ is necessarily a special character or explicit control block that is differentiated in its encoded form from data. Following the delimiter is a two-byte or two-block physical control field PCF divided into two blocks $PCF_1$ and $PCF_2$ that control access to the transmission ring and pass information to the node.

In FIG. 3 is illustrated the details of the first block $PCF_1$ of the physical control field. The bits of this first word $PCF_1$ are shown in their unencoded form. In generalized coding, the change of a single bit in an unencoded block will change the bits of the entire coded block. The first three bits of $PCF_1$ represent the priority mode PM which enables some nodes to be assigned different priorities from the other nodes. If a node does not have the priority corresponding to the packet, it is not able to gain access to that packet. The next bit is the token T indicating a free or busy token as previously discussed. In the format of Strole, the token is a single bit. As will be discussed later, it may be necessary to increase the size of the token T. The first block ends with a monitor control MC and a priority reservation PR. These fields will not be discussed but will be understood to occupy the same block as the token T.

If a node receives a packet with a free token T and it wishes to use that packet, it changes the value of T to indicate a busy token and thereafter inserts the address of the destination node in the DESTINATION field and inserts its own address in the SOURCE field of the header 22. In conventional 8B/10B coding methods, it is necessary to receive the entire first block $PCF_1$ and to execute the 10B/8B decoding before it is possible to recognize if the token T is busy or free. If the value of the token is changed, then $PCF_1$ needs to be re-encoded before being transmitted. This multi-step process necessarily introduces significant delay at each node.

According to the invention, it is not necessary to decode an entire block before the value of the token T can be recognized.

In one embodiment of the invention as applied to the 8B/10B coding of Widmer and Franaszek, the possible values of the $PCF_1$ are limited to the sub-blocks given in Tables 1 and 2 which are independent of the running disparity and have no alternates, i.e., those sub-blocks with an x in the D-1 column. It is to be recognized that the decoding of these sub-blocks is particularly simple in that the last encoded bits i or j are irrelevant to the decoding within the restricted subset. Furthermore, there is a direct correspondence between the unencoded bits ABCDE and the encoded bits abcde. That is, decoding consists of removing the sixth bit i from the encoded sub-block abcdei to arrive at the unencoded sub-block ABCDE. The same direct correspondence applies to the indicated subset for 3B/4B coding indicated in Table 2. If this restricted subset is used for the $PCF_1$, then any one bit or larger field can be recognized without explicit decoding. Therefore, only the relevant bits need to be received and compared to a reference field before a decision can be reached for the course of subsequent action.

Irwin describes in U.S. Pat. No. 3,624,637 a storage code from a data code that has one encoded bit that can be read directly without explicit decoding.

For fields such as the token, which need to be not only recognized but also changed without processing a large number of bits (which would necessitate storage of these bits) there is the further requirement in 8B/10B coding that the change not affect the running disparity. Since any change to a one-bit token would necessarily change the disparity, it is necessary to expand the token to at least two bits, much like Manchester coding except that the complementary bits need not be adjacent. For instance, a free token would be indicated by 01 and a busy token by 10. The token is thus a complementary pair which is inverted to its inverse value by taking the complement of the pair. For instance, if the priority bits are in abcd, representing 6 different priority levels (0101, 0110, 1001, 1010, 0011, 1100) and the token lies in the encoded bits e and i (01, 10), all possible bit combinations are within the restricted code set. If more priority levels are needed, abcdei can represent 18 levels within the restricted set and the token function can be assigned to the fg field, which belongs to the 3B/4B encoder. With the token in e and i, if e is recognized as a zero indicating a free token, the token can then be grabbed by immediately changing e to 1. Then when i is received, it can be changed from 1 to 0. Of course, this implies that the other two values of ei, 00 and 11, are not allowed so that the further restricted code is necessarily less efficient. If another indicator with properties similar to that of the token is desired, it can be placed in fg or hj. Then the pair of bits fg will have the same properties as the bits ei and each pair can be changed independently. In the general case of a ten-bit encoded code, not necessarily the 8B/10B code of Widmer and Franaszek, it is possible to have five complementary pairs or five independent fields of one-bit indicators. The inefficiency of this approach is manifested by ten encoded bits being necessary for five one bit indicators. It should be pointed out that if each of the complementary pairs are contiguous, then such coding, at least for the physical control field where it is used, is equivalent to Manchester coding in terms of the generated bit pattern, but not, of course, in terms of the pulse intervals which remain the same as for the 8B/10B encoding.

The result of this inefficiency is that the informational content of the blocks to which the restricted subset is applied during coding is significantly reduced from its possible value of 8 information bits per 10 bits transmitted. If the restricted subset with zero disparity given in Tables 1 and 2 is used, it is seen that only 18 out of the possible 32 unencoded five-bit sub-blocks can be used and only 4 out of the possible 8 unencoded three-bit sub-blocks can be used. Thus, the restricted subset has only between 32 and 72 possible values out of the possible 256 values in the unrestricted set depending on the number of individual indicators needed. However, such inefficiency is not necessarily undesirable. The delay within a node is sometimes determined by the speed of processing information in the header and trailer but the data throughput depends mostly upon the retransmission rate for the message sandwiched between the header and trailer. This message requires no further processing. Thus if some small control segments of the header and trailer are necessarily lengthened because of their restricted subset of values, the processing circuitry at the node may be able to handle the slower effective rate for the header and trailer while the message may be transmitted at a higher rate.

As applied to 8B/10 B coding, the restricted subset follows all the rules of normal 8B/10B coding and decoding. A particular advantage of restricted 8B/10 B coding is that each encoded sub-field remains directly readable without explicit decoding. Furthermore, each defined sub-field, as small as a pair of complementary encoded bits, can be individually changed without affecting any other field as long as the number of ones and zeroes in the encoded domain remains constant so as to not change the disparity. As a result, the response time requirement for the processing circuitry at the node can be relaxed or alternatively, the transmission rate for messages can be increased.

Many other codes differ from the 8B/10B code of Widmer and Franaszek in that they do not have a usable number of blocks or sub-blocks which correspond bit-by-bit between the encoded and unencoded forms. Nonetheless, this invention can be usefully applied to these other codes if subsets are defined within the full set of encoded values for which subfields exist which can be read and decoded without reference to the remainder of the block. Although decoding of the subfield is then required to obtain the unencoded sub-field, nonetheless the decoding is much simpler than the full decoding and the processing can commence before the reception of the entire encoded block. If the sub-field needs to be changed, as required for a token but probably not for a priority field, then the subset must also contain the inverse value to which the subfield is to be changed on the fly.

An example of a circuit useful for implementing this invention with the previously described 8B/10B code is shown in block form in FIG. 4 for one node. The node receives packets from the token ring on an incoming transmission line 20a which is connected to an input transducer 30 which produces a well defined signal train on its output 32. The output line 32 is connected to a clock recovery circuit 35 which recovers the frequency and phase of the incoming signal from the signal itself. The clock output 36 is connected to the control input of an edge-triggered flip-flop 38, the data input of which is connected to the output 32 of the input transducer 30. The effect of the flip-flip 38 is to sample the signal in the middle of its pulse in order to minimize noise errors and it outputs an internal signal on the flip-flop output 40.

A de-serializer/decoder 42 is connected to the flip-flop output 40. The de-serializer/decoder takes the serial data stream and converts it into parallel form using an additional function of a byte clock circuit that distinguishes the boundary between blocks. The de-serializer/decoder 42 then further decodes the parallel ten-bit signal into a decoded eight-bit signal, according to tables such as those provided by Widmer and Franaszek. The decoded signal is then fed to a ring interface adaptor 44 that is the interface between the token ring and a user system or device 46 that originates or receives messages on the token ring. The adaptor 44 provides the processing functions necessary for proper reception and transmission of messages.

Once the adaptor 44 has decided on the proper block for transmission, the corresponding eight-bit block is fed to a serializer/encoder 48 which encodes the eight-bit block into its ten-bit encoded form. It further serializes the encoded block and the serialized block is fed through an AND circuit 50 under the control of a control signal CONTROL 2 originating from the adaptor 44. The serialized block is further led through an OR circuit 52 and thence through an output transducer 54 to an output transmission line 20B which is part of the token ring.

What has been described to this point is fairly conventional in the prior art and accordingly suffers the disadvantage that an entire block needs to be received, de-serialized and decoded before the adaptor can effect any control based on control information in that block. Thereafter, the block is recoded and serialized before being retransmitted. The delay involved in the sequence of operations introduces unacceptable delays within the node.

According to the invention, the flip-flop output 40 is also fed to a direct reader 56 of physical control fields which receives its timing from the de-serializer/decoder 42. As previously mentioned, the direct reader 56 may consist of a single comparison circuit that, properly timed by the de-serializer/decoder 42, can recognize a characteristic one-bit of the token T without the need for de-serializing or decoding the block in which the token resides. The direct reader 56 is connected to the adaptor 44 by a token signal line 58 that notifies the adaptor 44 as to the value of the token based upon the single bit comparison. If the adaptor wishes to change the value of the token T, it outputs the new two-bit token on a serial output line 60 to an AND gate 62 under a control CONTROL 3 from the adaptor 44. The changed token is routed through the OR gate 52 onto the output transmission line 20b. The series of operations performed upon the token between the flip-flop 38 and the AND gate 62 are simple enough that they may be performed in a small fraction of a bit, that is, at a rate considerably faster than the bit rate. The result is that the token is recognized, possibly changed and then reinserted onto the token ring on the fly.

Once it has been determined that a received packet is to be simply retransmitted, the flip-flop output 40 is led through an AND gate 64 under the control of a control line CONTROL 1 originating from the adaptor 44 and thence through the OR gate 52 onto the output transmission line 20b. If the token bit can be changed without extensive decoding, processing and recording, that is within a small fraction of a bit period, then no buffering is required and the package can be immediately retransmitted bit-by-bit. If, however, there is an appreciable delay involved in the processing of the token bit, then a buffer 66 such as a shift register is inserted between the flip-flop 38 and the AND gate 64 to provide a corresponding delay for the retransmitted and unchanged packet. Nonetheless, it is seen that by use of the direct reader 56 of physical control fields directly inputting the adaptor 44, the delay at a node can be minimized and the buffering requirements significantly reduced. This implementation, of course, depends upon the physical control field being implemented in a subset of the encoded code that can be recognized bit-by-bit by the direct reader 56.

If the indicator that needs to be recognized contains more than one bit of information, then obviously multiple bits need to be received and possibly decoded before the adaptor 44 can take appropriate action. In this case, there will be a minimum delay within the node introduced by the number of bits within the sub-field. Nonetheless, the reception and decoding of an entire block within the de-serializer/decoder 42 are not required with a commensurate reduction in delay.

For extra fast response, token modifications can be executed in anticipation as follows: The communications adaptor 44 ready for transmission can anticipate that the next token of the proper priority will exit the node as a busy token, regardless of its status at the node input. Therefore, the adaptor can set up the proper code for a busy token in the encoder 48 well in advance and clock the busy token into the ring at the proper time based on the proper priority alone by enabling CONTROL 2 and disabling CONTROL 1. If the adaptor 44 at the same time or a little later recognizes that the entering token was free, it will proceed with the transmission of its packet. If the received token was already busy, the adaptor will just disable CONTROL 2 and enable CONTROL 1 right after it has entered the busy token. In this mode, CONTROL 3 and AND gate 62 are not needed.

The relaxed timing for nodal processing with this invention can be compared with that of Manchester coding. The time from the recognition of the previous bit to the time of insertion of a busy token is 1.5 bit periods for both Manchester coding and for 8B/10 B coding. For Manchester coding with a data transmission rate of 4 MHz or a transmission line rate of 8 MHz, 187.5 ns is allowed for processing. In contrast, 8B/10B coding operating at 4 MHz requires only a 5 MHz transmission rate so that 1.5 bit periods equals 300 ns, 60% longer than for Manchester code at the same data rate.

I claim:

1. A method of coding data to be communicated to a remote station and control information for controlling transmission and processing of said data, comprising:
   dividing unconstrained, unencoded data into blocks having an equal number N of bits;
   encoding each block of data into a coded block having a number M of bits where M is greater than N according to a set of code; and
   encoding control information into another coded block associated with said encoded data block and having a number M of bits according to a subset of said set of code, said subset having fewer members than said set and having at least one sub-field smaller than a field of said set which is encoded independently of the remaining portion of said field and of other unencoded blocks;
   wherein said control information comprises at least one indicator conveying a predetermined control message describable within only said sub-field.

2. A method of coding as recited in claim 1, wherein each bit of said decoded sub-field is determined separately by a corresponding bit of said encoded sub-field and a determination that said subfield is being decoded.

3. A method of coding as recited in claim 2 wherein an encoded indicator consists of two complementary bits within said sub-field.

4. A method of coding as recited in claim 2, wherein:
   said set of code is a DC balanced 8B/10B code divided into 5B/6B and 3B/4B coding sub-blocks; and
   said subset consists of encoded sub-blocks, each composed of equal numbers of ones and zeroes and wherein each encoded sub-block consists of the corresponding unencoded sub-block and one additional bit.

5. A method of coding as recited in claim 4, wherein an encoded indicator consists of two complementary bits within said sub-block.

6. A method of coding and data transmission as recited in claim 1, further comprising the steps of:
transmitting said encoded block of control information in a packet;
transmitting said encoded block or blocks of data in said packet, following said control information;
receiving said sub-field;
comparing said sub-field to a reference value before a remaining portion of the block in which said sub-field is located is received;
retransmitting said encoded block or blocks without decoding dependent upon said comparison.

7. A method of communication for data to be communicated from a first station to a second station and control information for controlling transmission and processing of said data, comprising the steps of:
A. at a first station:
transmitting said data at a signal rate, said transmitted data having a first information content of bits of information per bits of transmission;
controlling said data transmission with a controller in accordance with control information within fields of said control information; and
transmitting at least some of said control fields at said signal rate but with a second information content lower than said first information content; and
B. at a second station:
anticipating the reception of a predetermined first sequence within said some control fields;
preparing a predetermined second sequence for transmission upon the reception of said first sequence;
receiving said transmitted data and control fields; and
transmitting said second sequence upon reception of said first sequence.

* * * * *